(12) United States Patent
Lee

(10) Patent No.: US 8,807,869 B1
(45) Date of Patent: Aug. 19, 2014

(54) FLOATING BARRIERS

(76) Inventor: Li Lee, Housten, TX (US)

( * ) Notice: Subject to any disclaimer, the term of this patent is extended or adjusted under 35 U.S.C. 154(b) by 167 days.

(21) Appl. No.: 13/118,394

(22) Filed: May 28, 2011

Related U.S. Application Data

(63) Continuation-in-part of application No. 13/104,082, filed on May 10, 2011, which is a continuation-in-part of application No. 13/084,788, filed on Apr. 12, 2011, now abandoned.

(51) Int. Cl.
*E02B 3/06* (2006.01)

(52) U.S. Cl.
USPC .............................. 405/27; 405/63

(58) Field of Classification Search
USPC ............ 405/21, 23, 26, 27, 34, 35, 60, 63, 64
See application file for complete search history.

(56) References Cited

U.S. PATENT DOCUMENTS

| | | | | |
|---|---|---|---|---|
| 3,357,192 A * | 12/1967 | Hibarger | ...................... | 405/27 |
| 3,487,645 A * | 1/1970 | Frankel | ...................... | 405/26 |
| 3,534,558 A * | 10/1970 | Le Bouteiller | ................... | 405/26 |
| 3,807,178 A * | 4/1974 | Tanksley | ...................... | 405/67 |
| 4,190,381 A * | 2/1980 | Knaus et al. | ................... | 405/63 |
| 4,487,151 A * | 12/1984 | Deiana | ...................... | 405/26 |
| 4,688,024 A * | 8/1987 | Gadde | ...................... | 405/63 |
| 4,738,563 A * | 4/1988 | Clark | ...................... | 405/63 |
| 4,997,310 A * | 3/1991 | Rasmussen | ................... | 405/26 |
| 5,232,310 A * | 8/1993 | Wirkala | ...................... | 405/63 |
| 5,242,243 A * | 9/1993 | Bachelier | ...................... | 405/26 |
| 5,269,627 A * | 12/1993 | Neal | ...................... | 405/63 |
| 5,304,005 A * | 4/1994 | Loeffler-Lenz | ................ | 405/26 |
| 5,429,452 A * | 7/1995 | Frost | ...................... | 405/26 |
| 5,707,172 A * | 1/1998 | Wilcox | ...................... | 405/26 |
| 6,102,616 A * | 8/2000 | Foote | ...................... | 405/26 |
| 6,830,411 B1 * | 12/2004 | Amari | ...................... | 405/21 |
| 7,140,599 B1 * | 11/2006 | Spink | ...................... | 405/71 |
| 7,249,912 B2 * | 7/2007 | Reese | ...................... | 405/26 |
| 7,603,959 B1 * | 10/2009 | Veazey | ...................... | 114/263 |
| 8,303,212 B2 * | 11/2012 | Lara | ...................... | 405/63 |
| 2003/0044233 A1 * | 3/2003 | Hillard et al. | .................. | 405/21 |
| 2004/0018056 A1 * | 1/2004 | Wittenberg et al. | ............ | 405/26 |
| 2004/0234339 A1 * | 11/2004 | Dreyer | ...................... | 405/63 |
| 2006/0216116 A1 * | 9/2006 | Baker et al. | .................. | 405/63 |
| 2007/0283866 A1 * | 12/2007 | Veazey | ...................... | 114/77 R |
| 2011/0002739 A1 * | 1/2011 | Howland | ...................... | 405/26 |

* cited by examiner

*Primary Examiner* — Frederick L Lagman

(74) *Attorney, Agent, or Firm* — Kenneth A. Roddy

(57) ABSTRACT

There is disclosed a floating barrier for installation in deep oceans for dampening winds, waves, and currents, and for containing oil spills. Applications of this invention include tsunami wave alleviation, storm protection, and oil spill containment.

11 Claims, 13 Drawing Sheets

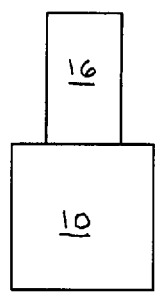
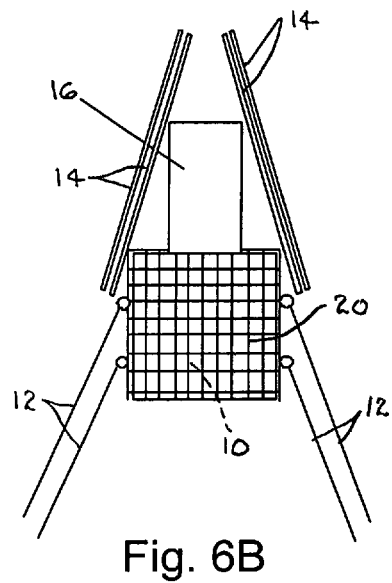
Fig. 6A
support structure
before installation
Fig. 6B
after installation

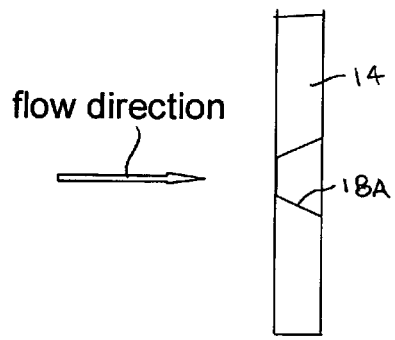
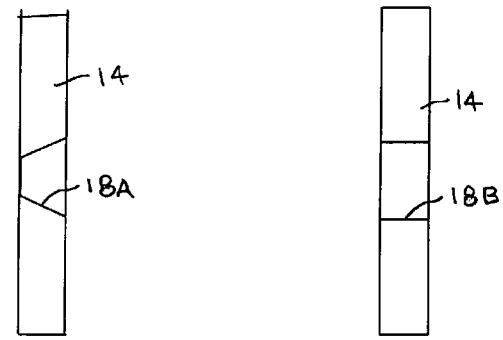
Fig. 10A
one-sided screen
Fig. 10B
two-sided screen
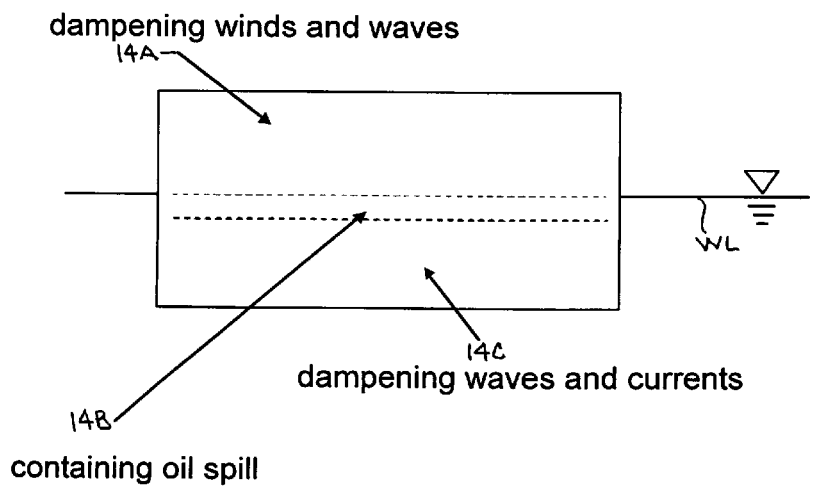
Fig. 11

FLOATING BARRIERS

CROSS REFERENCE TO RELATED APPLICATIONS

This application is a Continuation-In-Part of, and claims priority of, U.S. patent application Ser. No. 13/104,082, filed on May 10, 2011, which is a Continuation-In-Part of U.S. patent application Ser. No. 13/084,788, filed on Apr. 12, 2011 now abandoned.

FIELD OF THE INVENTION

The present invention relates to floating barrier methods and apparatus and, more particularly, to open ocean floating barriers used to protect ocean installations, harbors, and coastlines by dampening the forces of winds, waves, water currents, and containing oil spills.

BACKGROUND OF THE INVENTION

An ocean installation, such as an offshore platform for exploration and production of carbon hydrates, may experience high winds, large waves, and strong currents in its service life. This activity can also cause an oil spill. Coastal areas of continents are under the threat of tsunamis (as a result of an earthquake or a volcano eruption, e.g.), especially those regions surrounding the Pacific Ocean and the Indian Ocean. Harbors and low lying areas on coasts are prone to storm surge, such as the cities of New Orleans and Galveston in the United States. Man-made structures are used to mitigate the forces of the nature in some of the examples enumerated above.

Breakwaters, installed in shallow water and close to the coastal areas, are used to reduce the intensity of wave action, and therefore to reduce coastal erosion. Levees are used to prevent floods from, e.g., a storm surge. Oil booms have been used at a large scale, to contain oil spills.

Wave dampers are used to alleviate the strength of the wave forces in laboratories. In a wave basin, the wave dampers, consisting of layers of porous screens and located at one end, absorb the waves generated by wave makers at the opposite end. This way, the progressive waves generated at one end will reach the other with minimum reflection, so that ocean waves can be more realistically simulated. A study by Thomson indicated that with two layers of porous screens, 80% of wave transmission can be eliminated. Molin and Fourest studied the quantitative relation between wave absorption and the number of screens.

In an open ocean, winds, waves, and currents often act simultaneously. The wave dampers used in a laboratory, if installed offshore, can dampen the forces from all these disturbances. These dampers can also be designed to act as barriers to contain crude oil on the sea surface, in case of an oil spill. The issue is to have a support structure, in shallow and in deep water, on which the barriers can be mounted. The support structures must have minimum motions themselves in winds, waves, and currents.

If the water is not deep, say, less than 500 feet, a fixed platform concept can be used to support the barriers. However, very often there is a need to use barriers in a deep ocean, where the water depth is over 1,000 feet. One example is to dampen the tsunami waves, which have a smaller wave height in deepwater (about 3 to 6 feet), while these waves can reach over 30 feet or greater when they land on shore. Another example is the need to protect deepwater oil platforms, which are regularly operating at a water depth of over 5,000 feet. Floating barriers, if installed surrounding these platforms, can alleviate the environmental loads and barricade an oil spill, should it occur.

Over the past 40 years, floating structures at great ocean depth have been installed to explore and to produce carbon hydrates. New floating structure concepts also emerge. One of them is the fully constrained platform abbreviated as FCP shown and described in my copending U.S. patent application Ser. No. 13/084,788, which is hereby incorporated herein in its entirety. Referring now to FIG. 1 for the fully constrained platform concept hereinafter abbreviated as "FCP", a buoyant, surface structure FCP is constrained with a tether system 12 vertically and angularly. The tethers 12 are anchored on the seabed. The buoyancy generated by the buoyant surface structure FCP is larger than its weight. The excessive lift force is taken by the tether system 12, which will compensate for the payloads. A key feature of a FCP is that its motion is constrained in all six degrees of freedom, namely, surge, sway, heave, roll, pitch, and yaw, so that it will have minimal motion under environmental loads.

No known floating barriers have been permanently installed in deep oceans at a large scale. There is clearly a need in the art to alleviate winds, waves, and currents in an open ocean, in a gulf or in a bay, or to barricade an oil spill. The present invention discloses methods and apparatus for such a purpose.

SUMMARY OF THE INVENTION

The present invention is directed toward a floating barrier for applications in deep oceans, to dampen forces from winds, waves, and currents, and to contain an oil spill. The present floating barriers can also be used to protect ocean installations, harbors, and coastlines.

BRIEF DESCRIPTION OF THE DRAWINGS

FIGS. 6A and 6B are elevation views showing, somewhat schematically, a buoyant floating surface structure before and after installation of a net and tethers, respectively.

FIGS. 10A and 10B are partial cross sectional views showing a one-sided screen and a two-sided screen, respectively.

FIG. 11 is an elevation view of a screen having upper, middle, and lower portions for different purposes.

DETAILED DESCRIPTION OF THE INVENTION

Figure 1:
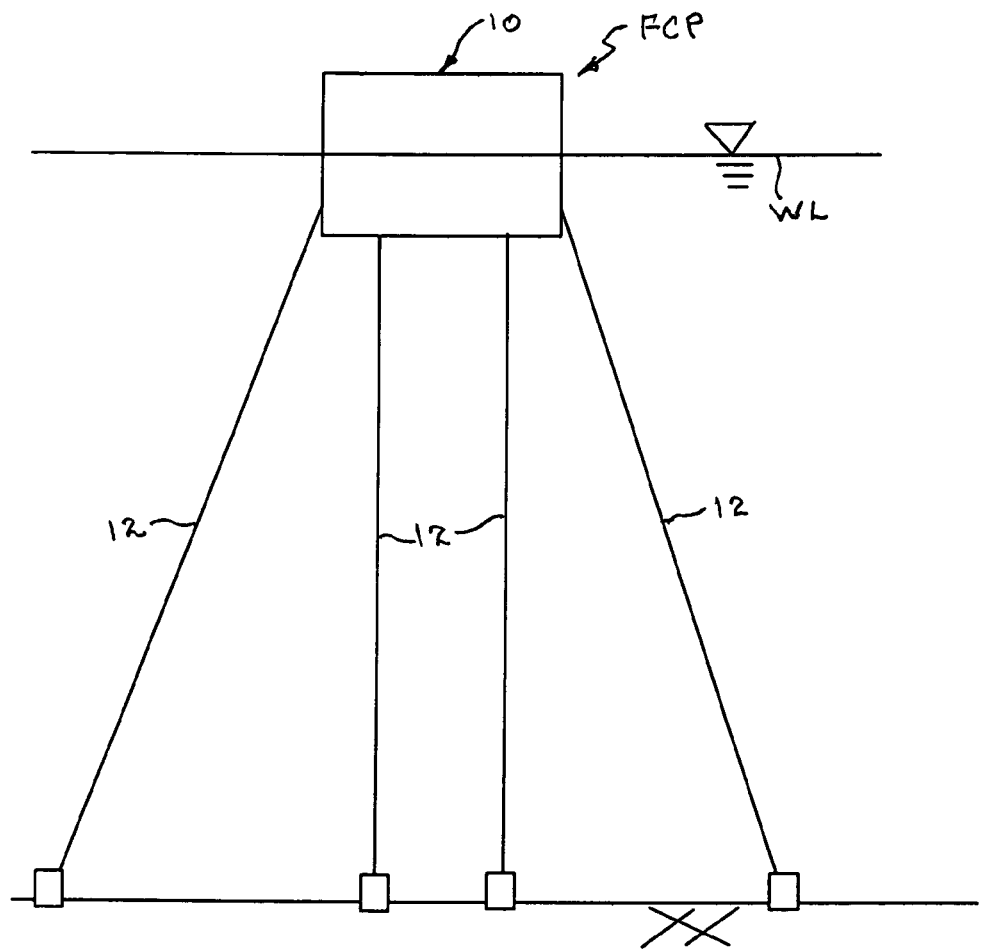
FIG. 1 is a side elevation view showing, somewhat schematically, a fully constrained platform.

The present invention is based upon a concept termed as "fully constrained platform" hereinafter abbreviated as FCP shown and described in my copending U.S. patent application Ser. No. 13/084,788, which is hereby incorporated herein in its entirety. As shown in FIG. 1, in a FCP, the buoyant, surface structure 10 is constrained by both vertical and angular tethers 12. Since a motion in any of the six degrees of freedom will stretch the tethers 12 and thus will be resisted by its axial stiffness, the buoyant, surface structure 10 is fully constrained. In oceans, there are many disturbances which can offset a buoyant, surface structure, such as the winds, currents, swells, and surface and internal waves. The wind, current, swell, and internal wave forces are mainly static or quasi-static in nature (meaning changing at a very low rate), while the surface waves are oscillatory. When a structure is subjected to steady loads, its motion is controlled by its stiffness. The greater the stiffness a structure has, the smaller the motion it experiences. Therefore, for a properly sized FCP, the steady motion can be a minimum.

For the dynamic forces from the oscillatory waves, the FCP system will respond with a dynamic amplification factor. In this case, the key to minimize responses of a FCP is to avoid resonance: the coincidence of the system natural frequencies and the excitation frequencies of waves. A structure in oceans can be sized by modifying its mass or stiffness to shift its natural frequencies away from the significant wave frequency zone. Since the payloads on a FCP are small, especially if the surface structure and/or the barriers are fabricated with light, non-metallic materials, such as polyesters or high density polyethylene (abbreviated as HDPE) or Glass Reinforced Epoxy (abbreviated as GRE), it is entirely feasible for the structures to avoid resonance.

The FCPs can therefore be used to support the barriers in deep oceans, for dampening the forces from winds, waves, and currents, and to contain an oil spill. The buoyant, surface structure 10 of a FCP can be partitioned into a plurality of tanks. When one of the tanks is damaged and flooded, the entire structure will still have sufficient buoyancy such that the normal function is not compromised. The buoyant, surface structure 10 is so designed that when the tethers 12 fail, the structure will still be stable. To eliminate the possibility of becoming a floating hazard in case the screens (described hereinafter) are detached from the buoyant, surface structure 10, their weights are designed to be heavier than that of the seawater. Once completely separated from their support structures, the screens will sink. Hooks embedded in the screen structures will aid in their recovery if needed.

Figure 2:
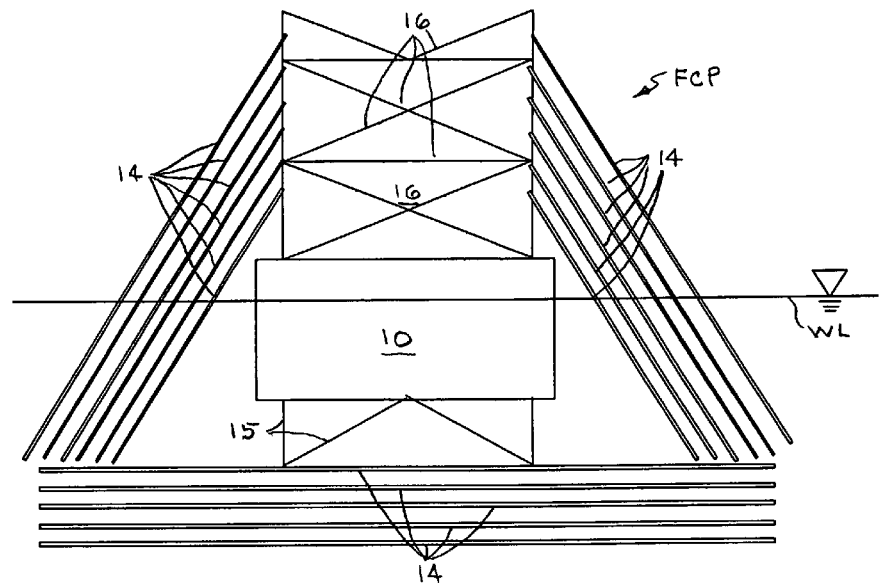
FIG. 2 is a side elevation view showing, somewhat schematically, a fully constrained platform having screens attached thereto.

Referring now to FIG. 2, in one embodiment, the buoyant, surface structure 10 of a FCP supports layers of porous screens 14, which are mounted on the left, right and bottom sides of the surface structure. The screens 14 on the left and right sides have inclinations, while at the bottom they are leveled. Truss sub-structures 15 and 16 are used to aid the mounting of the screens 14 at the bottom and at the top sides of the structure 10, respectively. As shown in FIG. 2, the buoyant, surface structure 10 is water surface piercing at the water line WL. Alternatively, it can also be fully submerged.

Figure 3:
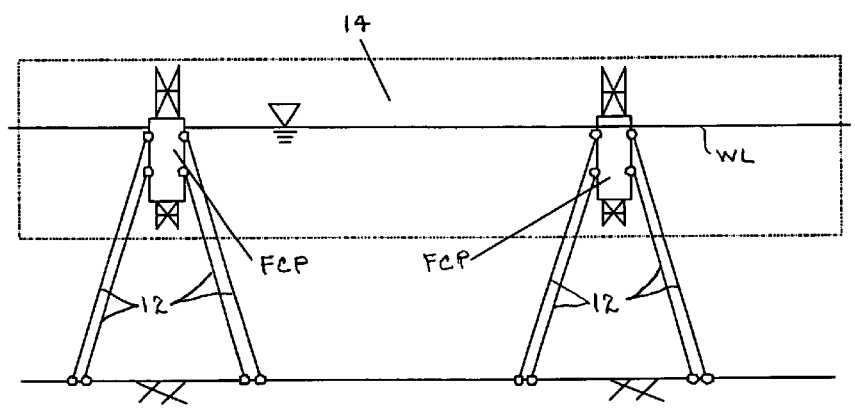
FIG. 3 is a side elevation view showing, somewhat schematically, elongate screens supported by two fully constrained platforms.

The configuration described above is for the screens 14 supported by two closely positioned FCPs. In this case, the screens 14 do not need intermediate supports. Referring now to FIG. 3 for a larger view, the screens 14 are supported by one FCP at one end and by a second FCP at the other end.

Figure 4:
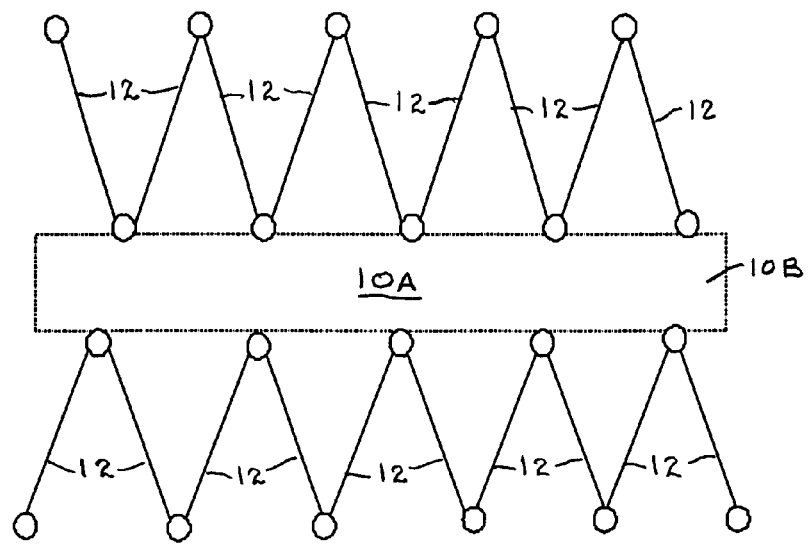
FIG. 4 is a schematic top plan view showing an elongate chainlike floating barrier.
Figure 5:
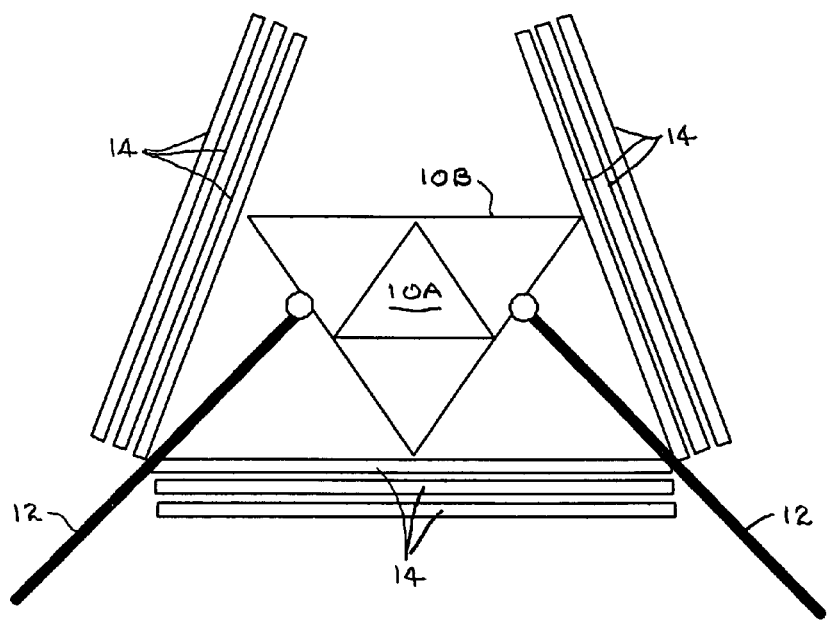
FIG. 5 is an end view of the chainlike floating barrier of FIG. 4.

Referring now to FIG. 4, there is shown, an elongate chain-like embodiment of the buoyant, surface structure 10A with the screens 14 attached and moored by tethers 12 attached at one end along its longitudinal direction sides. The other ends of tethers 12 are anchored onto the sea floor. As seen from one end in FIG. 5, the flat top surface 10B of the buoyant, surface structure 10A can be used as a passage for vehicles, to reach out to the entire route to perform routine maintenance work, such as removing the debris trapped by the screens. The buoyant, surface structure 10A may also be provide with wind turbines and solar panels along with batteries to provide electricity needed for maritime signals and lighting, etc, and thus can be self-sufficient.

As shown in FIGS. 6A and 6B, to minimize the motion of the buoyant, surface structure 10 in winds, waves, and currents, the tethers 12 can be integrated into a net 20, made from wire ropes and covering a portion of the surface structure. As seen in FIG. 6B, the lower part of the buoyant, surface structure 10 is constrained by the net 20 and the tethers 12. Screens 14 are attached to the buoyant surface structure 10.

Figure 7A:
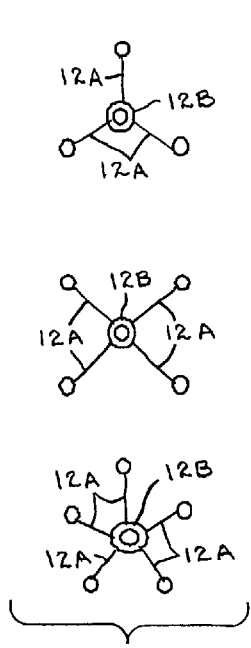
FIGS. 7A, 7B, and 7C are schematic illustrations of several configurations of a single tether having multiple attachment legs.
Figure 7B:
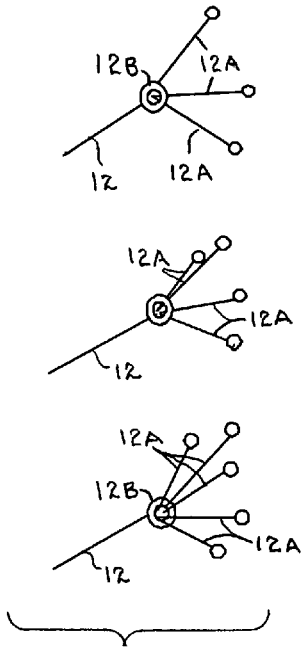
Figure 7C:
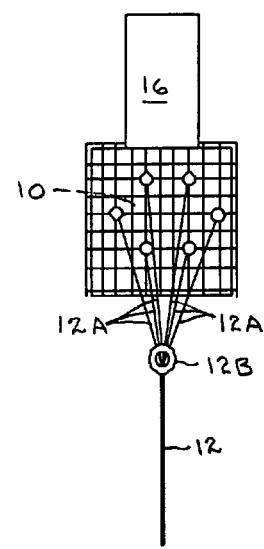

Referring now to FIGS. 7A, 7B, and 7C, a single tether 12 can also have multiple attachment legs 12A which are connected to the net at various positions to further increase the stability of the surface structure, and to reduce the number of tethers. FIGS. 7A and 7B illustrate various configurations of this single tether, multiple attachment leg system. FIG. 7C illustrates the single tether, multiple attachment leg system attached to a net 20 which covers a buoyant, surface structure 10. The tether joint 12B (from which the legs are coming out) is represented by a double circle. This tether joint 12B can be inside or outside of the water. The length of each attachment leg 12A can vary to accommodate the distance from the tether joint 12B to the net 20. The net 20 can be pre-assembled on the buoyant, surface structure 10, or alternatively, the net and the tethers may be connected before securing the buoyant, surface structure. The single tether, multiple attachment leg configuration can also cascade.

Figure 8:
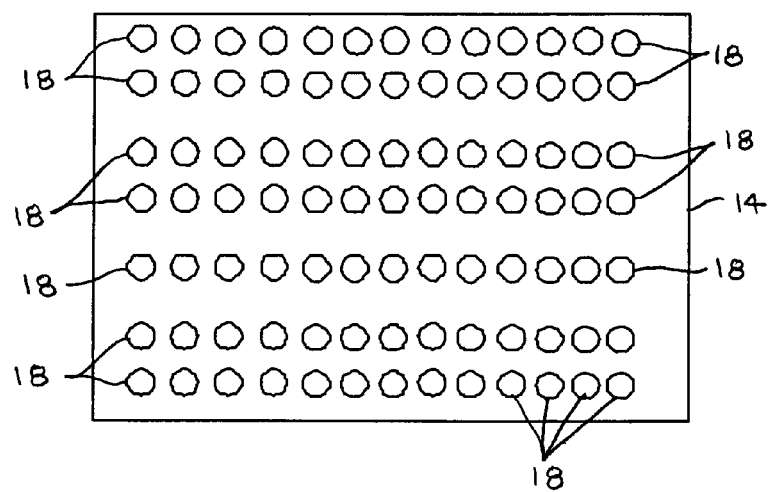
FIG. 8 is an elevation view of a screen having a plurality of perforations.
Figure 9:
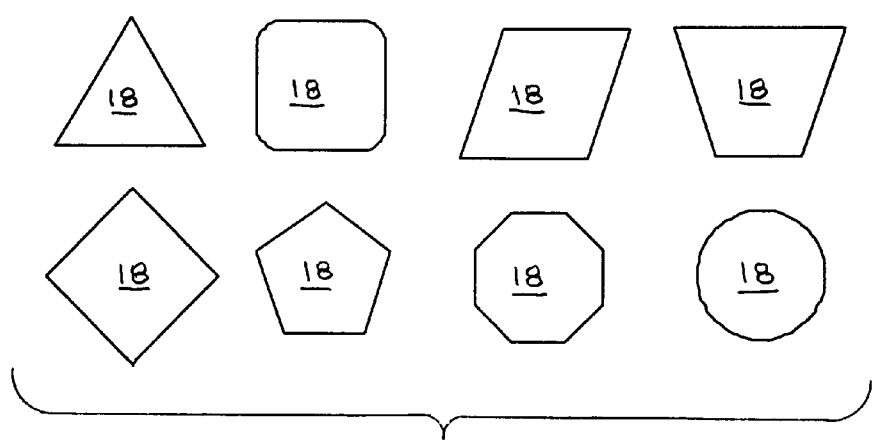
FIG. 9 is an elevation view of various shapes of perforations.

Referring now to FIG. 8, the screens of the floating barriers consist of plate sheets with perforations 18. These perforations 18 do not line up, from one screen to the adjacent screens, when layers of screens are used. The shape of the perforations can be a square, a circle, etc, as is illustrated in FIG. 9. Referring now to FIG. 10A, if the direction of the flow, indicated by the arrow, is known and is always in a particular direction, such as those used to protect a harbor, one-sided screens 14 having tapered perforations 18A are preferred, in order to relieve the pressure downstream. Otherwise, two-sided screens having straight perforations 18B should be used.

In regions where there are offshore drilling and production activities, the screens can be designed based on the concept illustrated in FIG. 11. The upper part 14A of the screen 14 is for dampening the winds and waves (the height of this portion will depend on the local wave height and the size of the object intended to protect). The middle part 14B of the screen 14 is for oil spill containment (the height of this portion is typically 3 to 6 feet, with the waterline centered approximately in the middle). The lower portion 14C of the screen 14 is for dampening the waves and currents. The height of this portion can be as large as a few dozens to one or two hundred feet.

Figure 12:
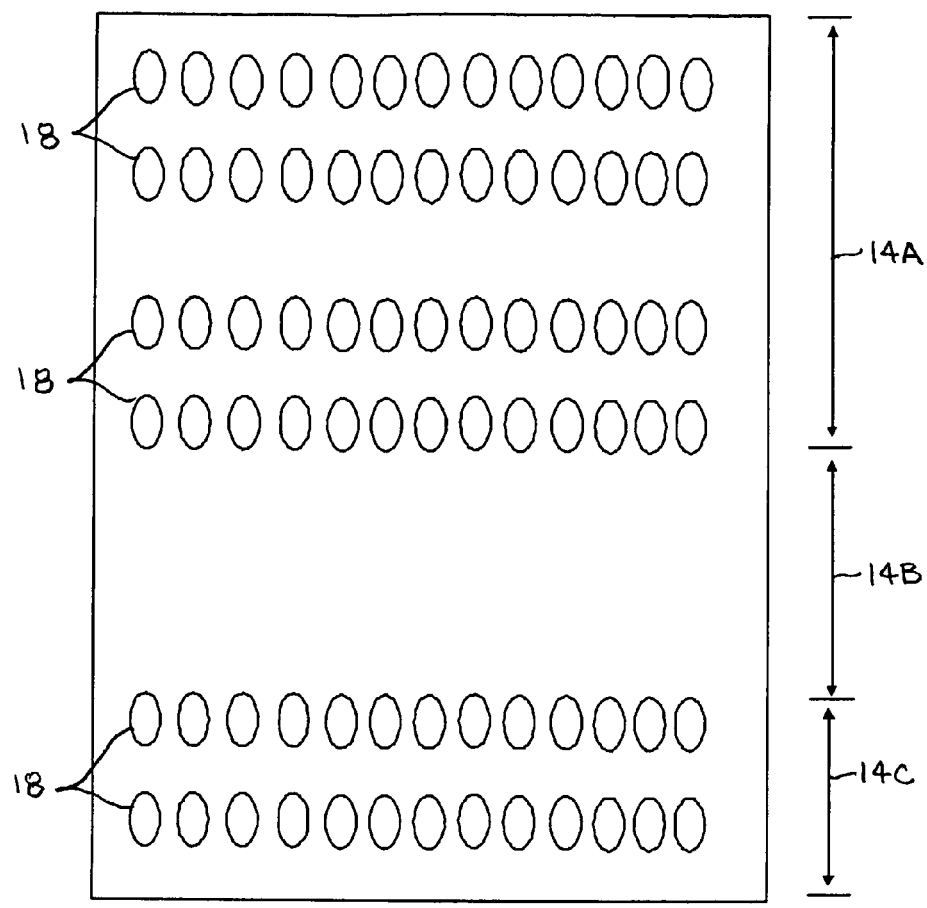
FIG. 12 is an elevation view of the screen of FIG. 11, showing a perforated upper portion for dampening winds and waves, a middle portion having no perforations for containing an oil spill, and a perforated lower portion for dampening ocean currents

In one embodiment of this screen design (referring additionally to FIG. 12), the height of the screen 14 is divided into three zones: zone 14A, with perforations, is for winds and waves, zone 14B, with no perforations, is for crude oil, and zone 14C, with perforations, is for waves and currents. Screens for other purposes can also be designed, such as those for the fishery industry.

Figure 13A:
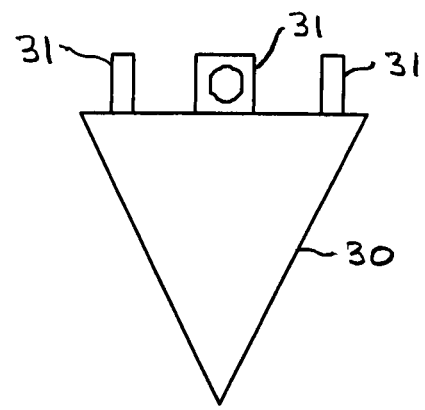
FIGS. 13A and 13B are a side elevation and a top plan view, respectively, showing a weight for use with the tethers.
Figure 13B:
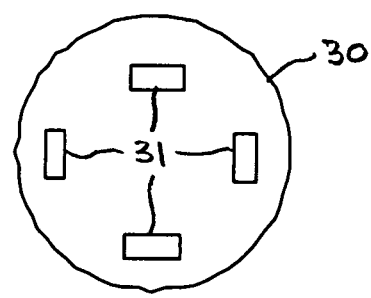

Referring now to FIGS. 13A and 13B, the anchors 30 for tethers 12 are such that the entire system can be quickly installed. The preferred type of anchor 30 is a gravity based anchor. In one embodiment, the anchor consists of a cone-shaped weight, preferably made from steel and with a plurality of hook eyes 31 welded on its flat surface. The tether lines 12 can be attached to the hook eyes 31.

The entire floating barriers can be fast quickly installed, segment by segment, following the method below.
(a) drop the weight anchor, which connects to one end of the tethers, from the installation boat,
(b) use small buoys to float the upper end of the tethers and/or nets,
(c) place the buoyant, surface structure in water,
(d) secure the said surface structure with the tethers and/or nets,
(e) attach screens if they are not already installed, and
(f) repeat steps (a) through (e) for each floating barrier segment.

Figure 14:
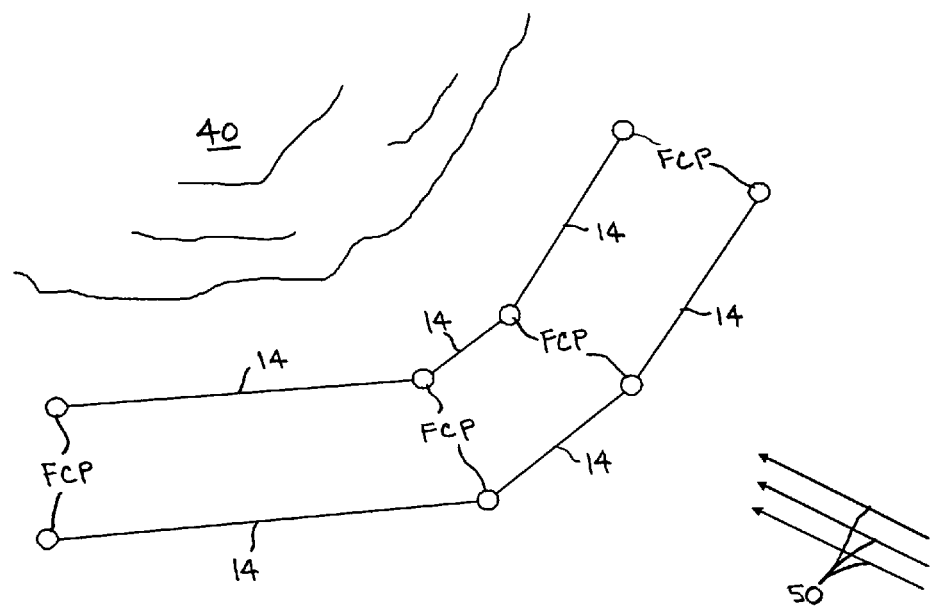
FIG. 14 is a schematic top plan view illustrating layers of floating barriers offshore of a coastline.

Referring now to FIG. 14, two or more layers of floating barriers formed of elongate screens 14 supported by FCPs, as shown in FIG. 3, are placed along the coast line 40, each being a few miles apart to act as barriers to prevent the buildup of waves of tsunamis or storms when they approach the shorelines, as represented by arrows 50. One particular application, with some urgency, is the preparedness for the consequences of earthquakes and volcanic eruptions in the "Pacific ring of fire". The protective barriers can be strategically placed, along the coast lines and surrounding the islands in the Pacific Ocean, to alleviate the tsunami waves.

Figure 15:
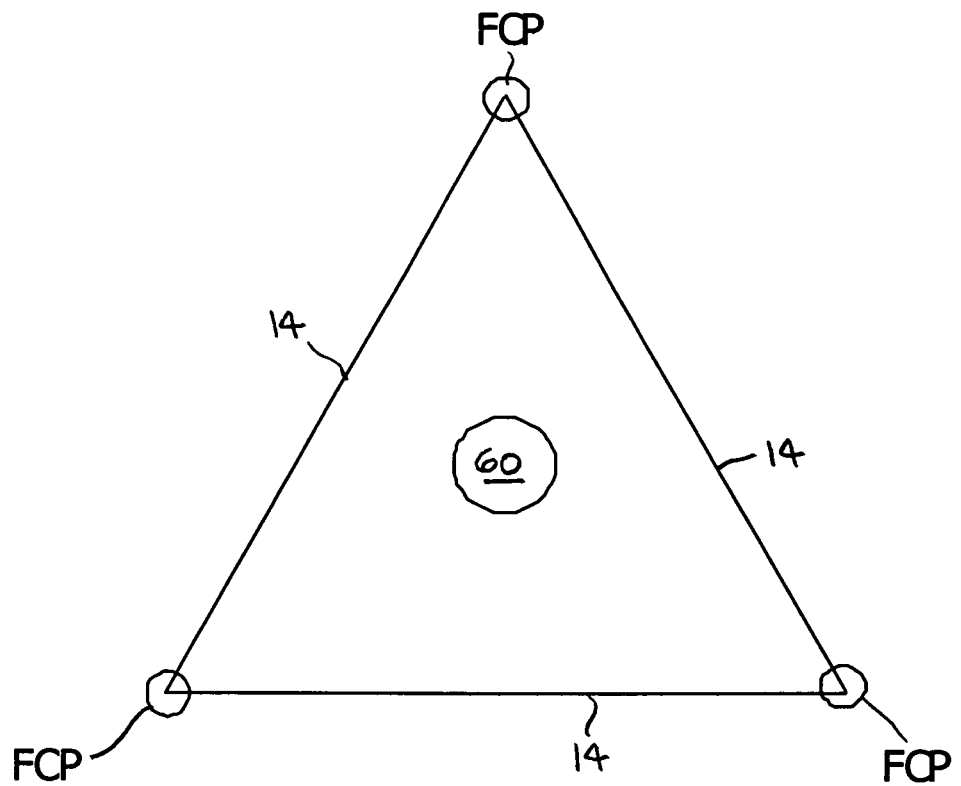
FIG. 15 is a schematic top plan view illustrating floating barriers surrounding an offshore oil and gas production platform.
Figure 16:
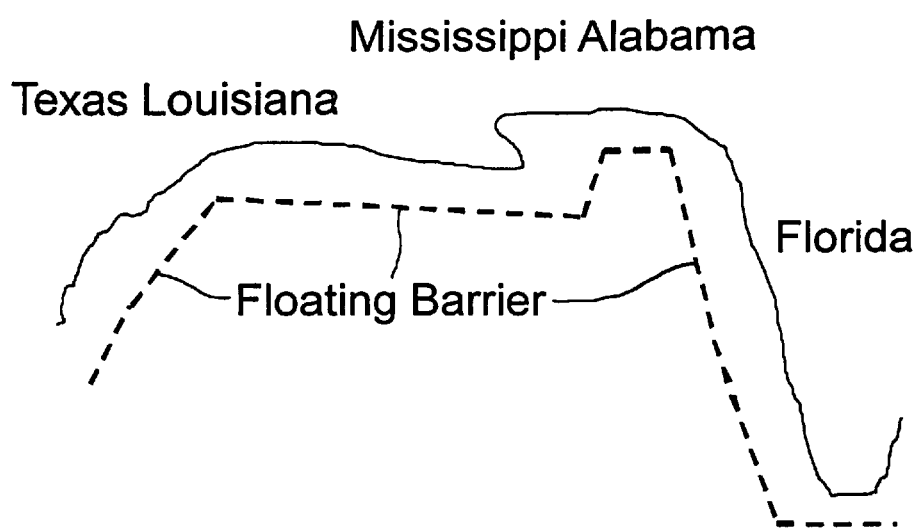
FIG. 16 is a schematic top plan view illustrating floating barriers offshore of the coastal states of the Gulf of Mexico.

As illustrated in FIG. 15, the floating barriers formed of the FCPs and screens 14 can also be installed around an important offshore structure, such as an offshore oil and gas production platform 60, to protect them from storm damages and to contain potential oil spills. A similar floating barrier system to that shown in FIG. 15 can be used to protect the shorelines of the states surrounding the Gulf of Mexico, as shown in heavy dashed line in FIG. 16. At certain positions along the route of the floating barriers, passages can be made to allow the traffic of ships and boats. These floating barriers are installed far from the shore and will not obstruct the views of the ocean.

I claim:

1. An ocean floating barrier for protecting ocean installations, harbors, and coastlines by dampening the forces of winds, waves, water currents, and containing oil spills, comprising:
an elongate buoyant floating platform structure having a top end, a bottom end, and opposed sides, said platform at least partially submerged beneath the water surface and equipped with buoyancy tanks fillable with liquid;
a tether system having a plurality of tethers each connected at a first end with said platform structure and extending downwardly and outwardly therefrom at an angle of from about 0° to about 45° relative to a vertical axis, and each anchored to the ocean floor at a second end; and
said buoyancy tanks being filled with liquid to function as liquid vibration dampers and to balance tension in said tethers; and
a plurality of generally flat rectangular perforated screens on said bottom end, and on said opposed sides of said platform, said screens on said bottom end of said platform disposed beneath the water surface, and said screens on said opposed sides of said platform having an upper portion disposed above the water surface and a lower portion submerged beneath the water surface.

2. The ocean floating barrier according to claim 1, wherein said elongate buoyant floating platform structure extends a distance horizontally and said top end is a flat surface configured to form a roadway for vehicles.

3. The ocean floating barrier according to claim 1, wherein said first end of at least one of said plurality of tethers has multiple leg portions diverging angularly outward therefrom that are connected at outer ends with said platform.

4. The ocean floating barrier according to claim 1, wherein said tether system includes a net covering at least a lower portion of said platform structure; and
said plurality of tethers are each connected at said first end with said net and extend downwardly and outwardly from said platform.

5. The ocean floating barrier according to claim 4, wherein said first end of at least one of said plurality of tethers has multiple leg portions diverging angularly outward therefrom that are connected at outer ends with said net.

6. The ocean floating barrier according to claim 1, wherein each of said plurality of perforated screens are formed of materials selected from the group consisting of polyesters, high density polyethylene, and glass reinforced epoxy.

7. The ocean floating barrier according to claim 1, wherein said upper portions of said screens on said opposed sides of said platform have perforations configured to dissipate winds and surface waves, said lower portions thereof have perforations configured to dissipate water currents and wave action beneath surface waves; and
said screens on said bottom end of said platform have perforations configured to dissipate water currents and wave action beneath surface waves.

8. The ocean floating barrier according to claim 1, wherein said upper portions of said screens on said opposed sides of said platform have perforations configured to dissipate winds and surface waves, said lower portions thereof have perforations configured to dissipate water currents and wave action beneath surface waves; and
a non-perforated intermediate portion between said upper portions and said lower portions configured to contain floating oil spills.

9. The ocean floating barrier according to claim 1, wherein said plurality of perforated screens on said bottom end, and on said opposed sides of said platform are disposed in layers with screen perforations of adjacent layers offset from one another.

10. The ocean floating barrier according to claim 1, wherein
said perforated screens on said bottom end of said platform are disposed horizontally beneath the water surface, and said perforated screens on said opposed sides of said platform are disposed at an angle relative to a vertical axis and converge upwardly from said perforated screens on said bottom end of said platform.

11. The ocean floating barrier according to claim 1, further comprising:

a plurality of said elongate buoyant floating platform structures disposed in spaced apart relation, each tethered to the sea floor by a respective said tether system; and said plurality of generally flat rectangular perforated screens are mounted on said bottom end, and on said opposed sides of adjacent said spaced apart platform structures and are adjoined to extend therebetween so as to form an elongate floating barrier.

* * * * *